US007896604B1

(12) United States Patent
Donlin et al.

(10) Patent No.: US 7,896,604 B1

(45) Date of Patent: Mar. 1, 2011

(54) ATV GAME LOADER

(76) Inventors: Bernard F. Donlin, Biloxi, MS (US); Travis Leon Hanson, Biloxi, MS (US)

(*) Notice: Subject to any disclaimer, the term of this patent is extended or adjusted under 35 U.S.C. 154(b) by 344 days.

(21) Appl. No.: 12/231,853

(22) Filed: Sep. 8, 2008

(51) Int. Cl.

| | |
|---|---|
| ***B60P 9/00*** | (2006.01) |
| ***B65F 3/00*** | (2006.01) |
| ***B65F 1/00*** | (2006.01) |
| ***B66C 23/44*** | (2006.01) |

(52) U.S. Cl. ........................ 414/462; 414/540; 414/551; 414/538; 212/180; 212/294

(58) Field of Classification Search ................... 193/41; 212/180, 294, 299, 300, 306; 254/227; 280/414.1; 296/61; 414/460, 462, 494, 500, 538, 541–542
See application file for complete search history.

(56) References Cited

U.S. PATENT DOCUMENTS

| | | | | |
|---|---|---|---|---|
| 29,606 | A * | 8/1860 | Lyons | 254/337 |
| 1,165,015 | A * | 12/1915 | Miksch | 414/538 |
| 1,194,893 | A * | 8/1916 | Stalker | 254/325 |
| 2,611,466 | A * | 9/1952 | Biggert et al. | 193/41 |
| 2,803,328 | A * | 8/1957 | Hinchman | 193/41 |
| 3,510,015 | A * | 5/1970 | Roshaven | 414/537 |
| 3,927,779 | A * | 12/1975 | Johnson | 414/462 |
| 4,806,063 | A | 2/1989 | York | |
| 5,393,194 | A * | 2/1995 | Smith | 414/546 |
| 5,662,451 | A | 9/1997 | Muzzi et al. | |
| 5,975,831 | A | 11/1999 | Martin | |
| 6,138,991 | A | 10/2000 | Myers, Jr. | |
| 6,155,771 | A | 12/2000 | Montz | |
| 6,530,738 | B2 | 3/2003 | Maxwell | |
| 6,612,549 | B1 | 9/2003 | Woods, Jr. | |
| 6,626,748 | B2 | 9/2003 | Homer, Sr. | |
| 6,695,566 | B2 * | 2/2004 | Rodriguez Navio | 414/538 |
| 7,156,246 | B2 | 1/2007 | Sherrod | |
| 2001/0043852 | A1 | 11/2001 | Maxwell | |
| 2002/0048504 | A1 | 4/2002 | Jacobs | |
| 2005/0254925 | A1 | 11/2005 | Braquet | |
| 2007/0045211 | A1 * | 3/2007 | Beatty | 212/180 |

OTHER PUBLICATIONS

Cabela's Web Site; UTV Roof Rack Dated Oct. 22, 2008.

* cited by examiner

*Primary Examiner*—Gregory W Adams
(74) *Attorney, Agent, or Firm*—George L. Williams

(57) ABSTRACT

Apparatus and method for loading articles, such as wild game or the like, into an all terrain vehicle (ATV). The device provides a tripod-type support on the front upper part of the ATV having a pulley at its apex whereby the cable from a winch on the front of the ATV is passed over the pulley and then extends over the ATV to the rear of the ATV where a sled is placed on the rear of the ATV so that an article placed at the base of the sled can be pulled up the sled and loaded into the ATV.

14 Claims, 3 Drawing Sheets

ATV GAME LOADER

BACKGROUND OF THE INVENTION

1. Field of the Invention

The present invention relates generally to all terrain vehicles (ATV) and, more particularly, is concerned with a device for loading articles into an ATV.

2. Description of the Prior Art

Devices for loading articles into ATV's have been described in the prior art, however, none of the prior art devices disclose the unique features of the present invention.

In U.S. Pat. No. 6,530,738 dated Mar. 11, 2003, Maxwell disclosed a vehicle mounted article loader apparatus. In U.S. Pat. No. 5,662,451 dated Sep. 2, 1997, Muzzi, et al., disclosed a game hoist. In U.S. Pat. No. 6,626,748 dated Sep. 30, 2003, Horner, Sr., disclosed a big game hoist and carrier assembly. In U.S. Pat. No. 4,806,063 dated Feb. 21, 1989, York disclosed a portable wild game hoist. In U.S. Pat. No. 5,975,831 dated Nov. 2, 1999, Martin disclosed an ATV-mounted game hoist. In U.S. Pat. No. 6,138,991 dated Oct. 31, 2000, Myers, Jr., disclosed a vehicle mounted hoist apparatus. In U.S. Pat. No. 6,155,771 dated Dec. 5, 2000, Montz disclosed a game hoist with rotating boom. In U.S. Pat. No. 6,612,549 dated Sep. 2, 2003, Woods, Jr., disclosed a hoist apparatus. In U.S. Patent Application Publication U.S. 2005/0254925 dated Nov. 17, 2005, Braquet disclosed a lift apparatus for an all terrain vehicle. In U.S. Pat. No. 7,156,246 dated Jan. 2, 2007, Sherrod disclosed a retractable, rotating ATV mounted lift boom. In U.S. Patent Application Publication U.S. 2002/0048504 dated Apr. 25, 2002, Jacobs disclosed an ATV mechanical lift. In U.S. Patent Application Publication U.S. 2001/0043852 dated Nov. 22, 2001, Maxwell disclosed a vehicle mounted article loader apparatus.

While these devices for loading articles may be suitable for the purposes for which they were designed, they would not be as suitable for the purposes of the present invention as hereinafter described.

SUMMARY OF THE PRESENT INVENTION

The present invention discloses a method and apparatus for loading articles, such as wild game or the like, into an all terrain vehicle (ATV). The present invention provides a tripod-type support on the front upper part of the ATV having a pulley at its apex whereby the cable from a winch on the front of the ATV is passed over the pulley and then extends over the ATV to the rear of the ATV where a sled is placed on the rear of the ATV so that an article placed at the base of the sled can be pulled up the sled and loaded into the ATV.

An object of the present invention is to provide a device for easily loading articles into an ATV. A further object of the present invention is to provide a device which can be easily used by the operator of an ATV. A further object of the present invention is to provide a device which can be easily and relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
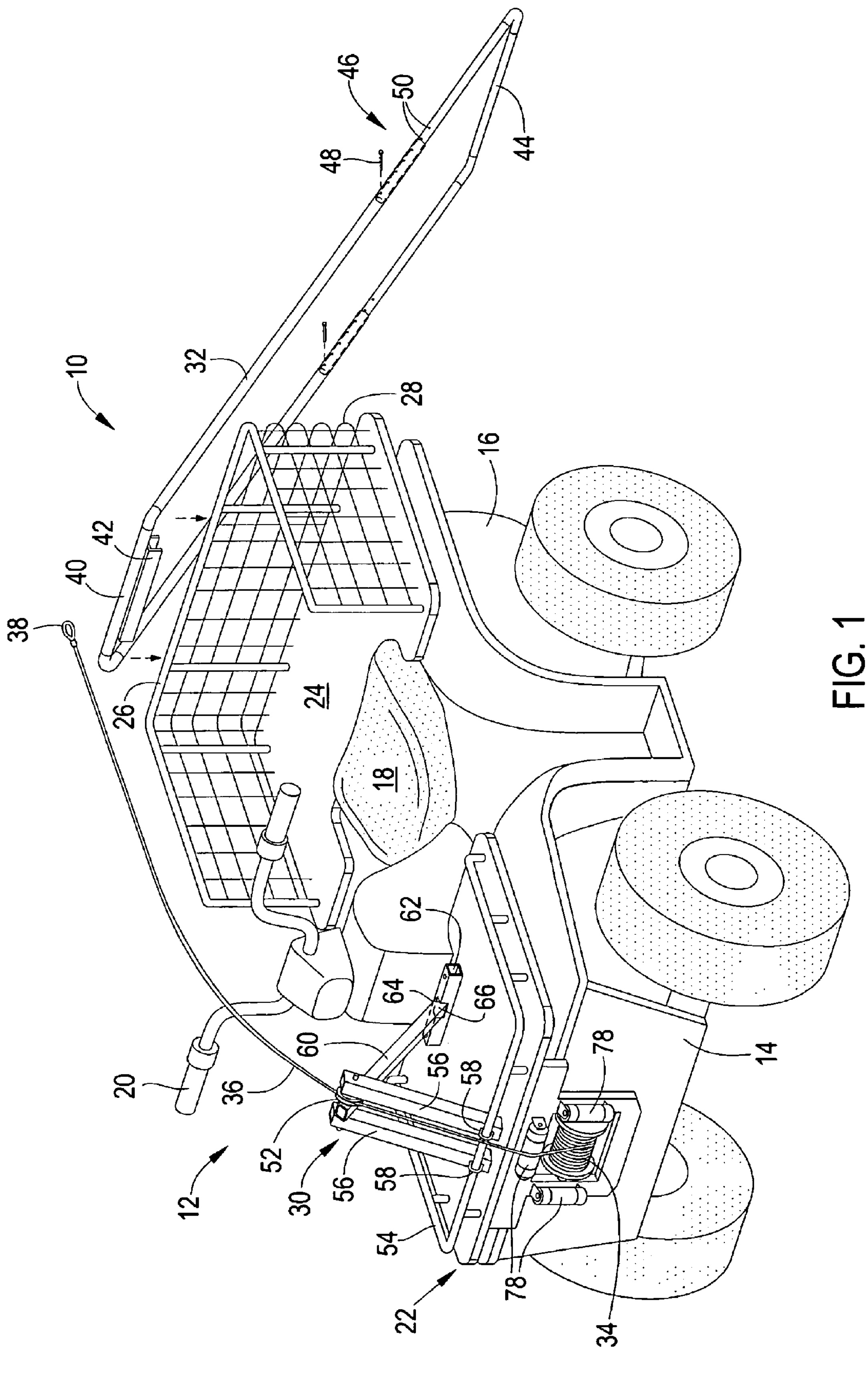
FIG. 1 is a perspective view of the present invention.

With regard to reference numerals used, the following numbering is used throughout the drawings.

10 present invention
12 all terrain vehicle (ATV)
14 front
16 rear
18 seat
20 handlebars
22 upper front hood
24 cargo area
26 top rung of cargo basket
28 lower rung of cargo basket
30 tripod
32 sled
34 winch
36 cable
38 end of cable
40 top end of sled
42 bracket
44 lower end of sled
46 means for length adjustment
48 pin
50 apertures
52 pulley
54 rail
56 outer legs
58 rotatable fastener
60 center legs
62 support block
64 notch
66 end of central leg
68 pivot
70 channel
72 arrow
73 arrow
74 surface of ground
76 article
78 roller

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS.

1-5 illustrate the present invention wherein a device for loading articles onto an all terrain vehicle (ATV) is disclosed.

Turning to FIG. 1, shown therein is the present invention 10 comprising an all terrain vehicle (ATV) 12 showing the front 14, rear 16, seat 18, handle bars 20, upper front hood area 22, cargo area 24, top rung of cargo basket 26, lower rung of cargo basket 28, tripod 30, sled 32, winch 34 with top and side rollers 78, cable 36, end of cable 38, top end of sled 40 having a bracket 42 extending downwardly therefrom so that bracket 42 encases or captures the top rung 26 of the cargo basket so as to secure the sled on the top of the cargo basket. Tripod 30 has outer legs 56 having fastener 58 rotatably mounted on rail 54 with one end 66 of central leg 60 mounted in notch 64 of block 62. Note that many ATV's have a cargo basket which is only approximately as high as the lower rung 28 shown on FIG. 1 so that with those ATV's bracket 42 would rest on the rung 28 of those type ATV's. Also shown is the lower end of the sled 44 and a means for length adjustment 46 using a removable adjustment pin 48 and a plurality of apertures 50 running longitudinally along each of the legs of the sled. In operation, cable 36 extends from the winch 34 over the pulley 52 of the tripod 30 over the top of the handlebars 20 and the top of the cargo basket 26, or 28, then over the upper end 40 of the sled 32 down toward the lower end 44 of the sled wherein the end 38 of the cable is tied to the article which is to be pulled back up the sled and into the cargo area 24. Pulley 52 is at an effective height so that the cable 36 is suspended above the ATV 12 so that the cable is free to operate properly.

Figure 2:
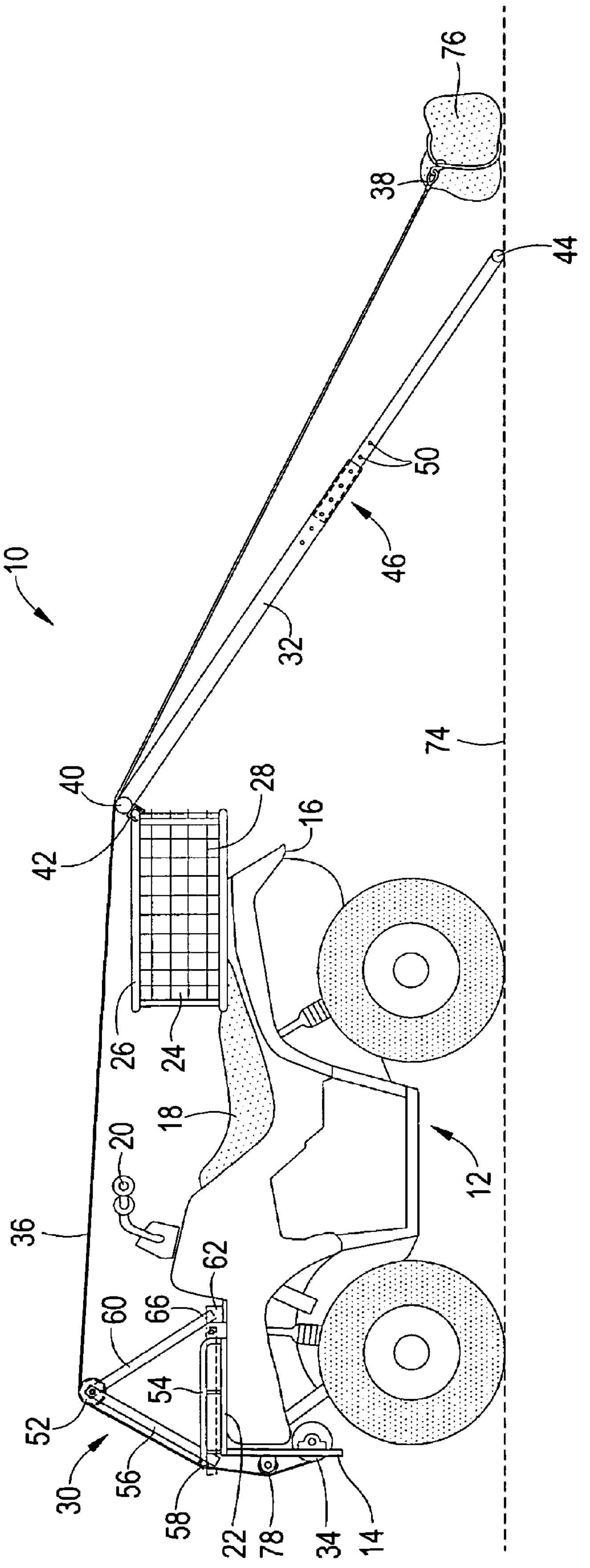
FIG. 2 is a side elevation view of the present invention.

Turning to FIG. 2, shown therein is the present invention 10 comprising an all terrain vehicle (ATV) 12 showing the front 14, rear 16, seat 18, handle bars 20, upper front hood area 22, cargo area 24, top rung of cargo basket 26, lower rung of cargo basket 28, tripod 30, sled 32, winch 34 with top and side rollers 78, cable 36, end of cable 38, top end of sled 40 having a bracket 42 extending downwardly therefrom so that bracket 42 encases or captures the top rung 26 of the cargo basket so as to secure the sled on the top of the cargo basket. Tripod 30 is shown in both the raised and folded position. Note that many ATV's have a cargo basket which is only approximately as high as the lower rung 28 shown on FIG. 1 so that with those ATV's bracket 42 would rest on the rung 28 of those type ATV's. Also shown is the lower end of the sled 44 resting on the supporting surface 74 of the ground and a means for length adjustment 46, using a removable adjustment pin and a plurality of apertures 50 running longitudinally along each of the legs of the sled so that the legs are telescopic. Sled 44 is stored in the cargo basket 24 when the sled is not in use and the sled is in the retracted position; the sled is removed from the basket and extended when the sled is to be used. In operation, cable 36 extends from the winch 34 over the pulley 52 of the tripod 30 over the top of the handlebars 20 and the top of the cargo basket 26, or 28, then over the upper end 40 of the sled 32 down toward the lower end 44 of the sled wherein the end 38 of the cable is tied to the article 76 which is to be pulled back up the sled and into the cargo area 24. Sled 32 may have left and right parallel members or may have a planar construction so that it can be stored in the retracted position. Other previously disclosed elements are also shown.

Figure 3:
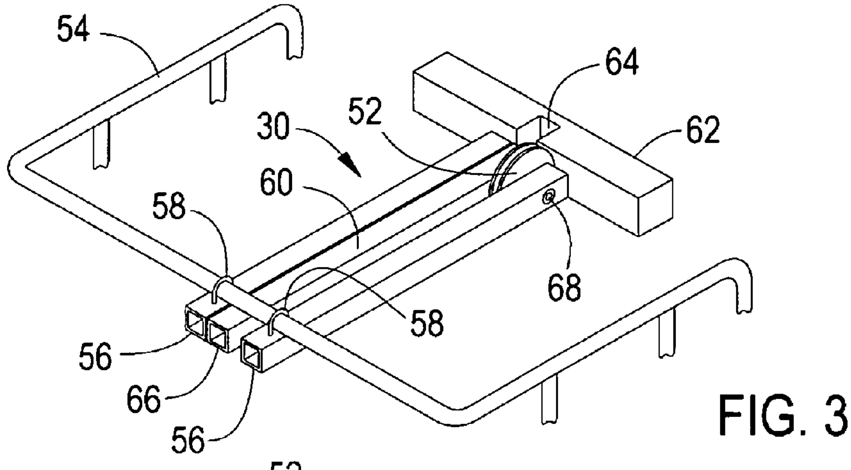
FIGS. 3-5 are perspective views of portions of the present invention.

Turning to FIG. 3, therein is shown tripod 30 in the folded position along with the rail 54 which is disposed on the hood 22 (not shown but see FIG. 1) of the ATV wherein tripod 30 has a pair of outer legs 56 having one end rotatably fastened at 58 to the rail so that the legs 56 can pivot about the rail by means of the rotatable fastener 58. Also shown is a center leg 60 disposed between legs 56 having an end 66 along with a support block 62 disposed on the top rear portion of hood 22 having a notch 64 therein so that one end of the central leg 66 can be placed in the notch 64. Also shown is a pivot member 68 passing through the legs 56, 60 and pulley 52.

Figure 4:
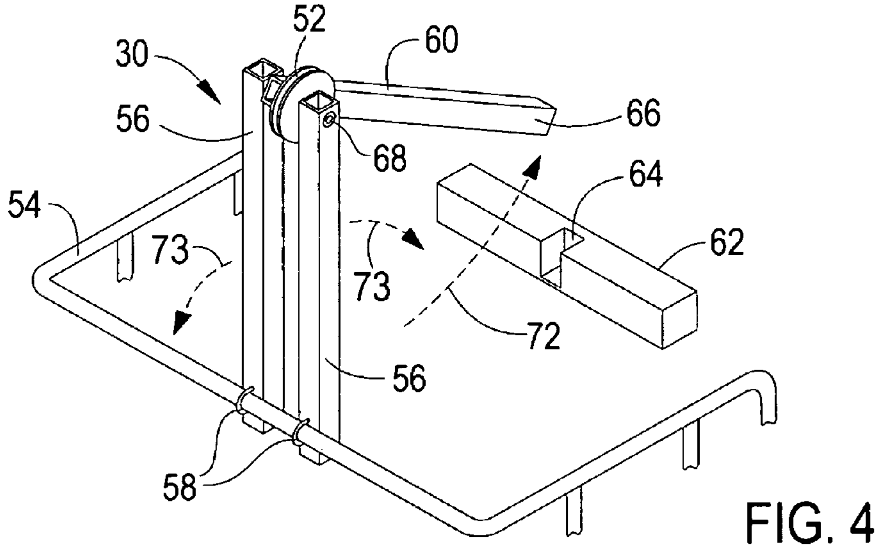

Turning to FIG. 4, therein is shown the end 66 of leg 60 being rotatably positioned as shown by arrow 72 and 73 so that it can be placed in the notch 64 of the block 62. Other previously disclosed items are also shown.

Figure 5:
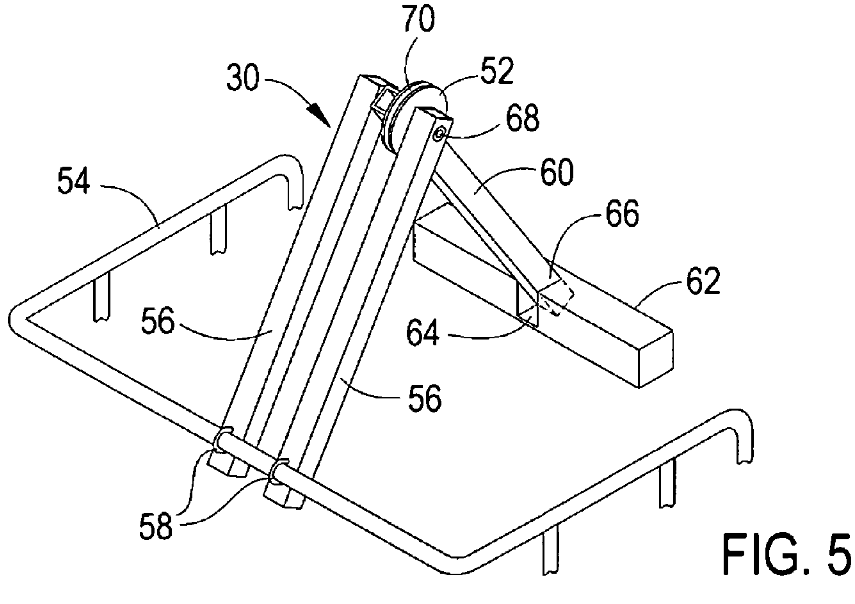

Turning to FIG. 5, therein is shown tripod 30 in the raised position with the end 66 of the central leg 60 disposed in the notch 64 of the support block 62 so that the pulley 52 is positioned at the apex of the support legs 56 and 60 so that the cable of the winch of the ATV can be placed in the track 70 of the pulley 52 so that the pulley is at an effective height so that the cable is suspended above the ATV so that the cable is free to operate properly. Other previously disclosed items are also shown.

We claim:

1. An apparatus for loading an article from a supporting surface into an all terrain vehicle, comprising:

a) an all terrain vehicle having front and rear ends, a front hood area, and a rear cargo basket, said hood having a raised rail extending along front and side edges of said hood;

b) a winch disposed on said front end of said all terrain vehicle, a cable being disposed on said winch, said cable having a first end to permit it to be attached to the article and a second end connected to said winch, said which being actuated by an operator;

c) a tripod being disposed on said front hood area of said all terrain vehicle, two rigid legs of said tripod having lower ends pivotally engaged with a front section of said rail, a third rigid leg of said tripod having an unattached distal end, a pulley being disposed on said tripod, wherein said tripod has a raised position with the distal end of said third leg being removably fitted into a notch of a base member, and a folded position behind a front section of said rail, said third leg of said tripod folded back and nested between said two legs resting directly on said hood area, wherein said pulley is disposed at an apex of said tripod in said raised position for receiving said cable from said winch;

d) a sled having first and second ends, wherein said first end is disposed on said rear cargo basket and said second end rests on the supporting surface; and, e) wherein said first end of said cable can be attached to the article on the supporting surface and the article can be pulled up said sled into said rear cargo basket when said winch is actuated by said operator.

2. An apparatus for loading an article from a supporting surface into an all terrain vehicle, comprising:

a) an all terrain vehicle having front and rear ends, a front hood area, and a rear cargo basket;

a winch disposed on said front end of said all terrain vehicle, a cable being disposed on said winch, said cable having a first end to permit it to be attached to the article and a second end connected to said winch, said winch being actuated by an operator;

c) a tripod being disposed on said front hood area of said all terrain vehicle, a pulley being disposed on said tripod, wherein said tripod has a raised position and a folded position, wherein said pulley is disposed at an apex of said tripod in said raised position for receiving said cable from said winch;

d) a sled having first and second ends, wherein said first end is disposed on said rear cargo basket and said second end rests on the supporting surface;

e) wherein said first end of said cable can be attached to the article on the supporting surface and the article can be pulled up said sled into said rear cargo basket when said winch is actuated by said operator; and f) said tripod further comprises first, second and third legs and a block disposed on said hood area, said block having a notch therein, each said leg having first and second ends, said first leg being disposed between said second and third leg, said first end of said second and third legs being rotatably attached to said front hood area so that said second and third legs can be moved from said folded position to said raised position and then back to said folded position, wherein said second end of said first, second and third legs and said pulley are pivotally connected so that said pulley is disposed at the apex of said tripod and said first end of said first leg is disposed in said notch of said block when said tripod is in said raised position.

3. The apparatus of claim 2, wherein said first, second and third legs are contiguous to each other and said hood area when said tripod is in said folded position, and, wherein said first, second and third legs are substantially horizontal when said tripod is in said folded position.

4. The apparatus of claim 3, wherein the length of said sled is adjustable.

5. The apparatus of claim 4, wherein said sled further comprises first and second parallel members, each said parallel member being telescopic, each said parallel member having a plurality of apertures therein, wherein said apertures are longitudinally spaced apart on each said parallel member, and, a pin being insertable into and removable from said apertures so that the length of said sled can be adjusted.

6. The apparatus of claim 5, a bracket being downwardly disposed on said first end of said sled, wherein said bracket is sized for being mounted on said rear cargo basket.

7. The apparatus of claim 6, wherein said pulley is disposed at an effective height above said all terrain vehicle when said tripod is in said raised position so that said cable can freely operate.

8. A method for loading an article from a supporting surface into an all terrain vehicle, comprising the steps of:

a) providing an all terrain vehicle having front and rear ends, a front hood area, and a rear cargo basket;

b) providing a winch on the front end of the all terrain vehicle, providing a cable on the winch, the cable having a first end to permit it to be attached to the article and a second end connected to the winch, the winch being actuated by an operator;

c) providing a tripod on the front hood area of the all terrain vehicle, providing a pulley on the tripod, wherein the tripod has a raised position and a folded position, wherein the pulley is disposed at an apex of the tripod in the raised position for receiving the cable from the winch;

d) providing a sled having first and second ends, wherein the first end is disposed on the rear cargo basket and the second end rests on the supporting surface; and, e) wherein the first end of the cable can be attached to the article on the supporting surface and the article can be pulled up the sled into the rear cargo basket when the winch is actuated by the operator; and f) wherein the tripod further comprises first, second and third legs, providing on the hood area, the block having a notch therein, each leg having first and second ends, the first leg being disposed between the second and third leg, the first end of the second and third legs being rotatably attached to the front hood area so that the second and third legs can be moved from the folded position to the raised position and then back to the folded position, wherein the second end of the first, second and third legs and the pulley are pivotally connected so that the pulley is disposed at the apex of the tripod and the first end of the first leg is disposed in the notch of the block when the tripod is in the raised position.

9. The method of claim 8, wherein the first, second and third legs are contiguous to each other and the hood area when the tripod is in the folded position, and, wherein the first, second and third legs are substantially horizontal when the tripod is in the folded position.

10. The method of claim 9, wherein the length of the sled is adjustable.

11. The method of claim 10, wherein the sled further comprises first and second parallel members, each parallel member being telescopic, each parallel member having a plurality of apertures therein, wherein the apertures are longitudinally spaced apart of each parallel member, and, a pin being insertable into and removable from the apertures so that the length of the sled can be adjusted.

12. The method of claim 11, further comprising the step of providing a bracket being downwardly disposed on the first end of the sled, wherein the bracket is sized for being mounted on the rear cargo basket.

13. The method of claim 12, wherein the pulley is disposed at an effective height above the all terrain vehicle when the tripod is in the raised position so that the cable can freely operate.

14. The method of claim 13, wherein the sled is stored in the cargo basket in the retracted position when the sled is not in use, wherein the sled is removed from the cargo basket and extended when the sled is in use.

* * * * *